US011202928B2

(12) United States Patent
Brubakken

(10) Patent No.: US 11,202,928 B2
(45) Date of Patent: Dec. 21, 2021

(54) FIRE EXTINGUISHER COVER FOR ELECTRIC VEHICLE

(71) Applicant: Frank Daniel Engell Brubakken, Larvik (NO)

(72) Inventor: Frank Daniel Engell Brubakken, Larvik (NO)

( * ) Notice: Subject to any disclaimer, the term of this patent is extended or adjusted under 35 U.S.C. 154(b) by 0 days.

(21) Appl. No.: 16/164,285

(22) Filed: Oct. 18, 2018

(65) Prior Publication Data

US 2019/0118013 A1 Apr. 25, 2019

(51) Int. Cl.
*A62C 3/07* (2006.01)
*A62C 8/06* (2006.01)
*B60J 11/04* (2006.01)
*A62C 2/10* (2006.01)
*A62C 3/16* (2006.01)

(52) U.S. Cl.
CPC ............ *A62C 3/07* (2013.01); *A62C 2/10* (2013.01); *A62C 8/06* (2013.01); *B60J 11/04* (2013.01); *A62C 3/16* (2013.01)

(58) Field of Classification Search
CPC .... A62C 3/07; A62C 2/10; A62C 8/06; A62C 3/16; A62C 2/00; A62C 2/04; A62C 2/06; A62C 3/00; B60J 11/04
USPC .................................. 169/62, 54, 48, 49, 50
See application file for complete search history.

(56) References Cited

U.S. PATENT DOCUMENTS

| 2,183,113 | A | * | 12/1939 | Bennett | A62C 8/06 |
| | | | | | 169/50 |
| 8,844,641 | B2 | * | 9/2014 | Peltz | A62C 2/065 |
| | | | | | 169/48 |
| 9,573,005 | B2 | | 2/2017 | Wedowski | |
| 10,183,563 | B2 | | 1/2019 | Rayner et al. | |
| 2004/0262018 | A1 | * | 12/2004 | Roussin | A62C 8/06 |
| | | | | | 169/50 |
| 2009/0190865 | A1 | * | 7/2009 | Chang | A45C 11/16 |
| | | | | | 383/110 |
| 2010/0200251 | A1 | | 8/2010 | Garcia | |
| 2011/0025089 | A1 | * | 2/2011 | Parker | B60J 11/04 |
| | | | | | 296/136.07 |
| 2012/0067600 | A1 | * | 3/2012 | Bourakov | A62C 3/0257 |
| | | | | | 169/46 |
| 2012/0318416 | A1 | * | 12/2012 | Siciliano | B60J 11/04 |
| | | | | | 150/166 |
| 2013/0068488 | A1 | * | 3/2013 | Walker | B60J 11/04 |
| | | | | | 169/48 |
| 2015/0069068 | A1 | * | 3/2015 | Hariram | A62C 3/16 |
| | | | | | 220/560.01 |

(Continued)

*Primary Examiner* — Justin M Jonaitis
(74) *Attorney, Agent, or Firm* — Osha Bergman Watanabe & Burton LLP

(57) ABSTRACT

Disclosed is a fire extinguisher cover for covering over a motor vehicle, the battery of which has caught fire. The cover comprises a sheet for covering over the vehicle, the sheet comprising an opening disposed thereon, and a casing assembly comprising a plurality of spaced apart casings and a drawstring running through the plurality of casings. The drawstring is arranged to be tightened to achieve a tight abutment between the casing assembly, the ground and the vehicle tires when the vehicle is covered by the sheet, and the fire-extinguishing fluid is run through the at least one opening to be fill up between the vehicle and the sheet resulting in said fluid reaching the battery for extinguishing the fire emanating therefrom.

15 Claims, 4 Drawing Sheets

(56) References Cited

U.S. PATENT DOCUMENTS

2015/0273251 A1* 10/2015 Sporre .................... A62C 8/06
169/50
2016/0047120 A1 2/2016 Davis

* cited by examiner

FIRE EXTINGUISHER COVER FOR ELECTRIC VEHICLE

CROSS REFERENCE TO RELATED APPLICATION

The present application claims the benefit of Norway Patent Application No. 20171690 filed Oct. 20, 2017, the contents of which is hereby incorporated by reference.

BACKGROUND OF THE INVENTION

A. Technical Field

The present disclosure relates to safety accessories pertaining to electric motor vehicles and more particularly, to a fire extinguisher cover that extinguishes fire emanating from the batteries of an electric vehicle.

B. Description of Related Art

In a prior art reference, CN201098486Y of Liu Bo, discloses a fire extinguisher cover for covering over motor vehicle in heat distress. The cover comprises a sheet having zipper and snap mechanism enabling it to form a flameproof enclosure for the vehicle, wherein the bottom of the enclosure can be fully contacted with the ground so as to prevent supplement of surrounding air and combustion-supporting action of wind power to carry out fire smothering. The sheet comprises at least one opening disposed thereon used for injecting carbon dioxide into the enclosure so as to extinguish fire in the enclosure.

In another prior art reference, CN106693233A of Taiyuan Nuoya Science & Tech Co. Ltd, discloses a portable car fire-extinguishing device comprising a folded wrap cover that is arranged to be opened into an umbrella shape. The cover comprises a fireproof cloth and supporting gas prism which is evenly distributed on, and adhered to, the outer surface of the fireproof cloth. The gas prism is sealed between an outlet of a gas generator and an air intake port of the supporting gas prism. The fireproof cloth may be made into a shape to just cover the car, and to provide no ventilation. When the cover is to be applied to cover the car on fire, an electric ignition device is activated to generate support gas prism and then start to open valve for a fire extinguishing agent cylinder. The gas rushes into the supporting gas prism, and the gas prism expands so that the fireproof cloth is extended into the umbrella shape. A valve at the top of the wrap cover is then opened, and the fire extinguishing agent is sprayed into the housing to extinguish the fire.

Lithium-ion battery (or batteries) are nested within electric vehicles such that, they are quite difficult to access. Said difficulty escalates to impossibility when said battery catches fire. Fire emanating from lithium-ion battery is virtually unstoppable as (a) as mentioned earlier, the battery is inaccessible and (b) the fire, which is aided by high voltage, cannot be choked by cutting off oxygen. The battery needs to be cooled down to a minimum of 120° C. first as quickly as possible in order for the fire to be taken out.

SUMMARY OF THE INVENTION

This summary is provided to introduce a selection of concepts in a simplified form that are further disclosed in the detailed description of the invention. This summary is neither intended to identify key or essential inventive concepts of the claimed subject matter, nor is it intended for determining the scope of the claimed subject matter.

An embodiment of the present invention is directed to a fire extinguisher cover for a motor vehicle in heat-distress. The motor vehicle is an electric motor vehicle in heat-distress, wherein battery (or batteries) is on fire. The objective of the cover is to bring down the temperature of the battery to a safe level as quickly as possible and then proceed to extinguish the fire. The cover made of fire-resistant material or materials.

The cover comprises a rectangular sheet and a casing assembly integrally attached to the rectangular sheet. The sheet comprises a pair of openings disposed thereon. The casing assembly comprises a plurality of elongate casings disposed on the bottom surface of the sheet wherein, the casings are adapted to run a drawstring therethrough. The plurality of casing is arranged close to an outer edge of the sheet around a whole circumference of the sheet. The casings are divided into longitudinal casings, which are disposed closer to the longitudinal edges of the sheet, transverse casings, which are disposed closer to the longitudinal edges of the sheet, and oblique corner casings disposed between longitudinal and transverse casings. The drawstring is arranged to be tightened to achieve a tight abutment between the casing assembly, the ground and the vehicle tires when the vehicle is covered by the sheet. Then, the fire-extinguishing fluid is run through the at least one opening to fill up between the vehicle and the sheet resulting in said fluid reaching the battery for extinguishing the fire emanating therefrom.

In order to deploy the cover over a vehicle on fire, the cover is first covered over the vehicle such that the bottom surface of the sheet abuts the vehicle body. Once covered, the cover is snugly secured over the vehicle by tightening the drawstring and locking it in place. More particularly, pulling the drawstring will force the sheet to tighten along the ground towards the tires and create a tightly secured upside-down bag. This causes the substantial edge of the sheet to move inwardly toward the wheels of the vehicle while the rest of it to abut the sides of the vehicle and on the ground. At this point, water is flown in through the openings by means of, say, a fire hose. The weight of the water presses the sheet against the ground whereby the engagement between the sheet and the ground is tightened thereby preventing any leak between the sheet and the ground. The water fills up inside the enclosed blanket until it at least submerges the battery. This results in the battery being cooled down to a safe 120° C. and eventually, said water extinguishing remaining fire emanating from the battery.

Other objects, features and advantages of the present invention will become apparent from the following detailed description. It should be understood, however, that the detailed description and the specific examples, while indicating specific embodiments of the invention, are given by way of illustration only, since various changes and modifications within the spirit and scope of the invention will become apparent to those skilled in the art from this detailed description.

BRIEF DESCRIPTION OF DRAWINGS

The foregoing summary, as well as the following detailed description of the invention, is better understood when read in conjunction with the appended drawings. For the purpose of illustrating the invention, exemplary constructions of the invention are shown in the drawings. However, the invention is not limited to the specific methods and structures disclosed herein. The description of a method step or a structure referenced by a numeral in a drawing is applicable to the description of that method step or structure shown by that same numeral in any subsequent drawing herein.

FIGURES—REFERENCE NUMERALS

10—Fire Extinguisher Cover
12—Sheet
14—Casing
16—Drawstring
18—Opening
20—Motor Vehicle
22—Water
24—Eyelet

DETAILED DESCRIPTION OF EMBODIMENTS

In the following detailed description, a reference is made to the accompanying drawings that form a part hereof, and in which the specific embodiments that may be practiced is shown by way of illustration. These embodiments are described in sufficient detail to enable those skilled in the art to practice the embodiments and it is to be understood that the logical, mechanical and other changes may be made without departing from the scope of the embodiments. The following detailed description is therefore not to be taken in a limiting sense.

The present invention is directed to a fire extinguisher cover for an electric motor vehicle, the battery (or batteries) of which is on fire. On a side note, said battery usually comprises a Lithium-ion battery. The objective of the cover is to direct the water over and around the battery, which, as mentioned earlier, is on fire. This cools down the battery to a safe temperature as quickly as possible whereafter, the cover facilitates the extinguishing of the fire. For instance, the Lithium-ion battery is known to be unstable when hit or heated of from fire in the car elsewhere. In order to take out the fire, the battery needs to be cooled down to a minimum of 120° Celsius as quickly as possible. The cover is water proof and is additionally made of a fire-resistant material or materials. Further, the cover is also immune to strong voltage as it is coated with an isolating material that resists high voltage.

Figure 1:
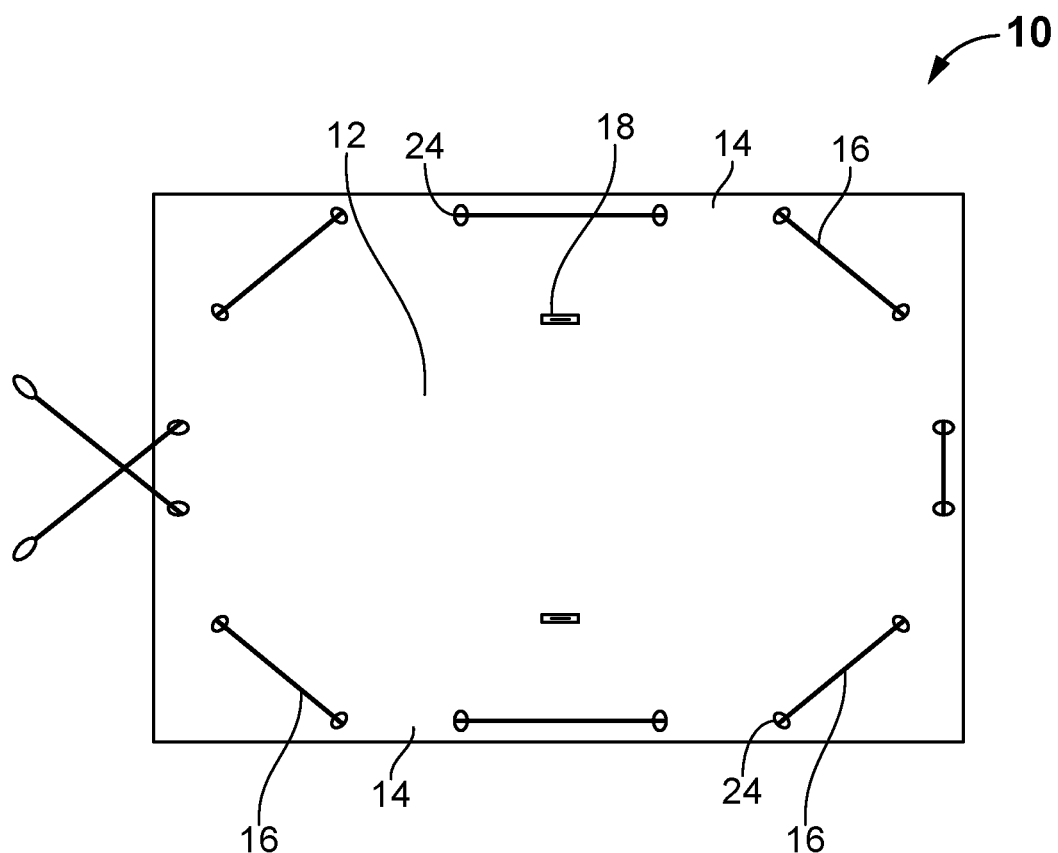
FIG. 1, according to an embodiment of the present invention, is an illustration of a plan view of the cover.

Referring to FIG. 1, the cover 10 comprises a rectangular sheet 12 defined by a pair of opposing longer longitudinal and shorter transverse edges and inner and outer surfaces and a top and a bottom surface. The sheet 12 comprises openings 18 disposed thereon wherein, the utility of the openings 18 will become apparent from the following body of text. The cover 10 further comprises a casing assembly, the function of which is to achieve a tight-abutment between the sheet 12 and the vehicle 20 tires. The casing assembly comprises a plurality of casings 14 that are adapted to run an un-looped drawstring 16 therethrough. The plurality of casing 14 is arranged close to an outer edge of the sheet 12 around a whole circumference of the sheet 12. The drawstring 16 is arranged to be tightened to achieve a tight abutment between the casing assembly, the ground and the vehicle 20 tires when the vehicle 20 is covered by the sheet 12. Then, the fire-extinguishing fluid is filled through at least one opening 18, wherein the fire-extinguishing fluid is filled between the vehicle 20 and the sheet 12 allowing the fluid to reach the battery for extinguishing the fire emanating therefrom.

Still referring to FIG. 1, the casing 14 are integrally disposed on the bottom surface of the sheet 12 closer to the edges thereof. The casings 14 comprise elongate longitudinal casings disposed closer to the longitudinal edges of the sheets 12, elongate transverse casings disposed closer to the transverse edges of the sheet 12 and oblique corner casings disposed between the longitudinal and transverse casings. The open extremity of each casing is lined with an eyelet 24. Each free end of the drawstring 16 is attached with a handle. The drawstring 16 runs through the casings 14 and each free end thereof extends out of an eyelet 24. More particularly, the handles extend out of opposingly-disposed eyelets 24 wherein, said eyelets 24 pertain to transverse casings 14.

Figure 2:
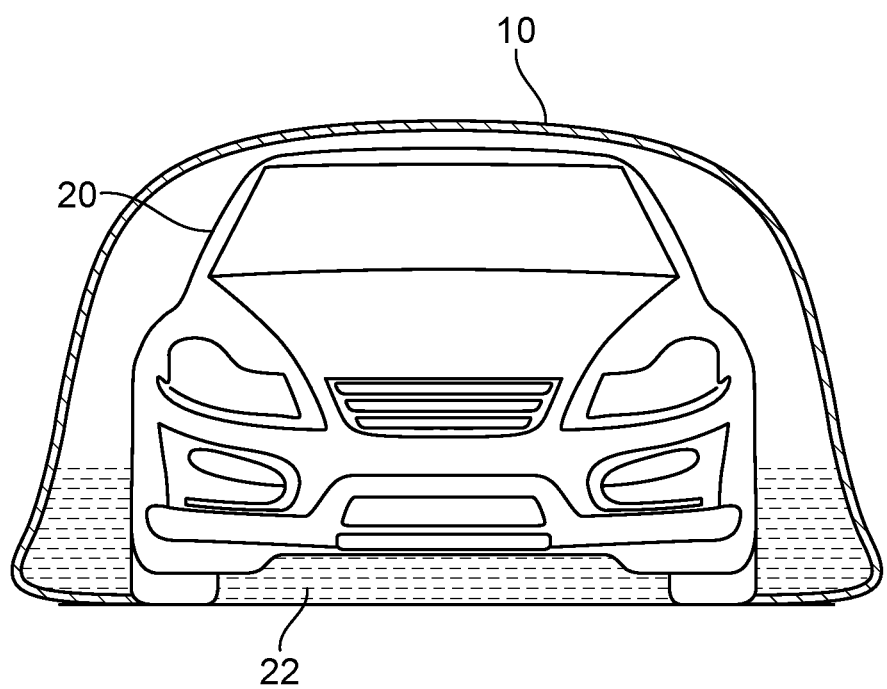
FIG. 2, according to an embodiment of the present invention, is an illustration of water being filled between the cover and the motor vehicle.
Figure 3:
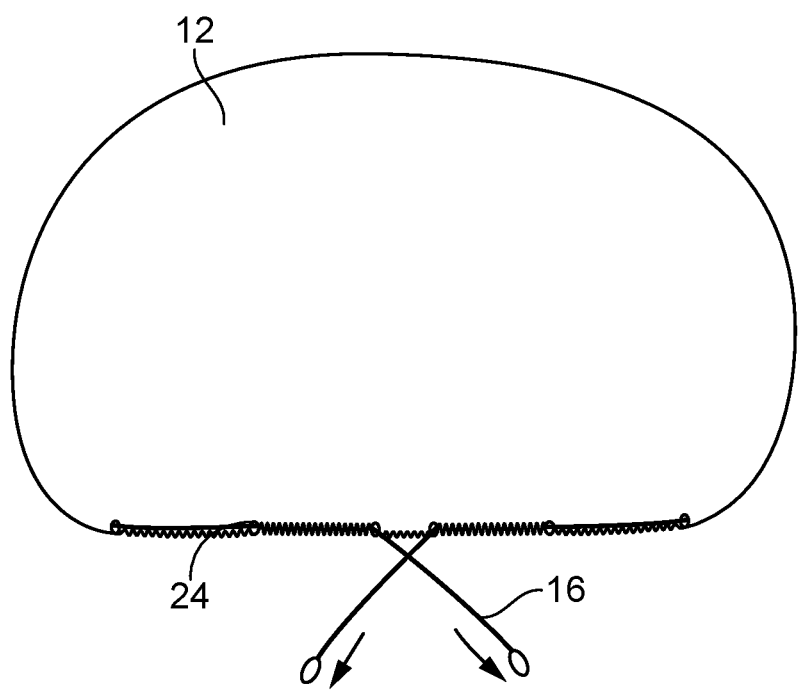
FIG. 3, according to an embodiment of the present invention, is an illustration of the cover tightened over a motor vehicle.
Figure 4:
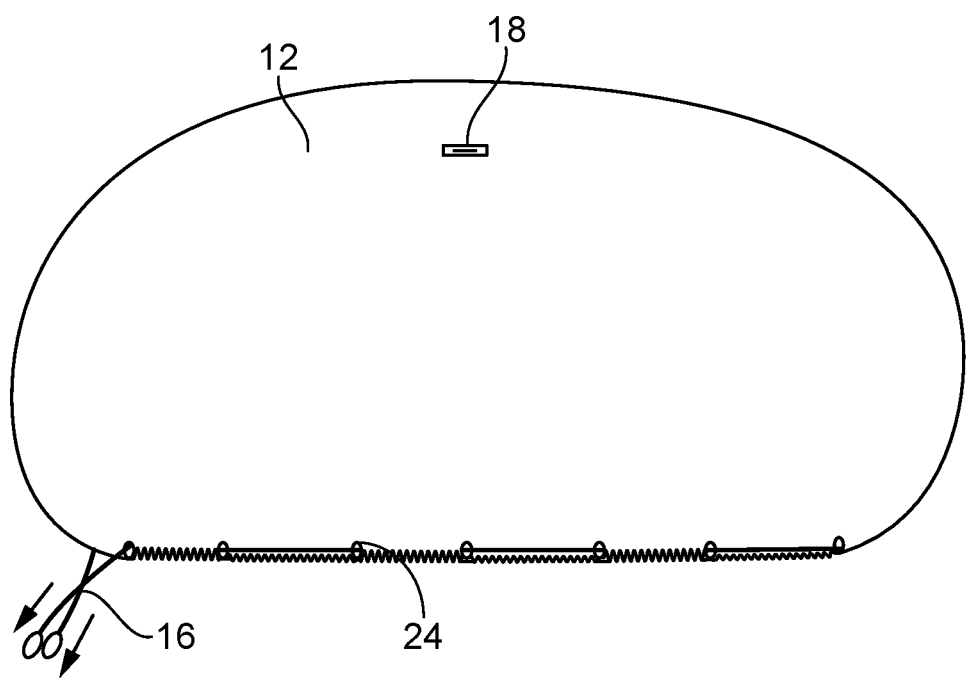
FIG. 4, according to an embodiment of the present invention, is another illustration of the cover tightened over a motor vehicle.

Referring to FIGS. 2 through 4, in order to deploy the cover 10, the cover 10 is covered over the vehicle 20 such that, the bottom surface thereof abuts the vehicle 20 body. Once the vehicle 20 covered by cover 10 like an upside-down bag, the handles are pulled outwardly. This causes the casing assembly (and thereby the sheet attached thereto) to tightly abut beneath the vehicle 20 tires forming a water-tight engagement therebetween. More particularly, pulling the handles will force the sheet 12 to tighten along the ground towards the tires and create an upside-down bag where some portions of the top surfaces of the sheet 12 abut the ground. Once tight abutment between the edges of the sheet 12 and the vehicle 20 tires is ascertained, the pulled handles are secured by means of knot, cord locks, or the like.

Still referring to FIGS. 2 through 4, at this point, a fire-extinguishing fluid, i.e., water 22, is let into the openings 18 by means of, say, a fire hose. On a side note, the weight of the water pushes the sheet 12 down, which forms a watertight engagement between the cover 10 and the ground. This creates minimum leakage between the ground and the cover 10. Running water 22 through openings 18 results in said water 22, owing to the watertight engagement between the sheet 12, vehicle 20, and the ground, to fill up the enclosed cover 10 and eventually rise to cover the battery. This causes the battery to be cooled down to below 120° C. whereafter, the fire emanating therefrom is taken out promptly. The cover 10 is preferably employed by professional firefighters and said cover 10 and gives them a tool that quickly, safely and easily takes out fire.

The foregoing examples have been provided merely for the purpose of explanation and are in no way to be construed as limiting of the present concept disclosed herein. While the concept has been described with reference to various embodiments, it is understood that the words, which have been used herein, are words of description and illustration, rather than words of limitation. Further, although the concept has been described herein with reference to particular means, materials, and embodiments, the concept is not intended to be limited to the particulars disclosed herein; rather, the concept extends to all functionally equivalent structures, methods and uses, such as are within the scope of the appended claims. Those skilled in the art, having the benefit of the teachings of this specification, may affect numerous modifications thereto and changes may be made without departing from the scope and spirit of the concept in its aspects. For example, the cover 10 could be deployed over a conventional non-electric motor vehicle, the component(s) or the entirety of which has caught fire, such as a car, truck, etc.

What is claimed is:

1. A fire extinguisher cover for covering a motor vehicle having at least one battery on fire and vehicle tires that are in contact with ground, the fire extinguisher cover comprising:
    a sheet with at least one opening for receiving a fire-extinguishing fluid, wherein the sheet is a rectangular shape defined by a pair of opposing longer longitudinal sides and a pair of opposing shorter transverse sides; and
    a casing assembly attached to the sheet, the casing assembly comprising:
        a plurality of spaced apart casings arranged close to an outer edge of the sheet around a whole circumference of the sheet; and
        at least one drawstring running through the plurality of spaced apart casings;
    wherein, the at least one drawstring is arranged to be tightened to achieve a tight abutment between the casing assembly, the ground, and the vehicle tires such that, when the motor vehicle is covered by the sheet and the fire-extinguishing fluid is run through the at least one opening of the sheet, the fire-extinguishing fluid fills up space between the motor vehicle and the sheet from the ground up to the motor vehicle, based on the formed tight abutment between the casing assembly, the ground, and the vehicle tires, resulting in the fire-extinguishing fluid reaching the at least one battery for extinguishing the fire emanating therefrom,
    wherein, the at least one drawstring comprises one un-looped drawstring, the free ends of which extend from open extremities of two casings, the free ends of the drawstring being disposed at one of the two opposite transverse sides of the sheet, the extremities of the two casings being opposingly disposed, wherein each free end is fitted with a handle and the handles are arranged to be pulled outwardly for tightening the drawstring when the cover is arranged on the vehicle, and the open extremity of each casing is lined with an eyelet,
    wherein the fire extinguisher cover is made of fire resistant and waterproof materials, and
    wherein the fire extinguisher cover is coated with an isolating material that is resistant to high voltage.

2. The cover according to claim 1, wherein the at least one opening comprises a plurality of openings.

3. The cover according to claim 1, wherein the fire-extinguishing fluid comprises water.

4. The cover according to claim 1, wherein the sheet is rectangular.

5. The cover according to claim 1, further comprising a securing mechanism attached to the pulled handles that maintains the tight abutment between the casing assembly, the ground, and the vehicle tires when the fire-extinguishing fluid is run through the at least one opening.

6. The cover according to claim 1, wherein a fluid-tight abutment is formed between the casing assembly, the ground, and the vehicle tires.

7. The cover according to claim 6, further comprising a securing mechanism attached to the pulled handles that maintains the fluid-tight abutment is formed between the casing assembly, the ground, and the vehicle tires when the fire-extinguishing fluid is run through the at least one opening.

8. The cover according to claim 1, wherein the plurality of spaced apart casings are integrally disposed on a bottom surface of the sheet, and wherein the plurality of spaced apart casings comprise:
    elongate longitudinal casings disposed closer to longitudinal edges of the sheet,
    elongate transverse casings disposed closer to traverse edges of the sheet, and
    oblique corner casings disposed obliquely between the longitudinal and transverse casings.

9. A fire extinguisher cover for covering a motor vehicle having at least one battery on fire and vehicle tires that are in contact with ground, the fire extinguisher cover comprising:
    a sheet with at least one opening for receiving a fire-extinguishing fluid,
    wherein the sheet is defined by a pair of opposing longer longitudinal sides and a pair of opposing shorter transverse sides,
    wherein the sheet is made of fire resistant and waterproof materials, and
    wherein the sheet is coated with an isolating material that is resistant to high voltage; and
    a casing assembly integrally disposed on a bottom surface of the sheet, the casing assembly comprising:
        a plurality of spaced apart casings, each having an eyelet lining open extremities thereof, arranged along an outer edge of the sheet around a whole circumference of the sheet,
        wherein the plurality of spaced apart casings comprise:
            elongate longitudinal casings disposed along to longitudinal edges of the sheet;
            elongate transverse casings disposed along to traverse edges of the sheet; and
            oblique corner casings disposed obliquely between the longitudinal and transverse casings; and
        at least one drawstring running through all of the plurality of spaced apart casings in an un-looped manner with each end of the drawstring extending from one of an open extremity of an elongate transverse casing on a transverse side of the sheet and an open extremity of an adjacent elongate transverse casing on the same transverse side of the sheet,
        wherein each end of the drawstring is fitted with a handle that is larger than the eyelet of the casing from which the end of the drawstring extends,
    wherein, upon covering the motor vehicle with the sheet and pulling on the handles of each end of the drawstring, the at least one drawstring tightens the sheet around the motor vehicle to form a tight abutment between the casing assembly, the ground, and the vehicle tires such that, when the fire-extinguishing fluid is run through the at least one opening of the sheet, the fire-extinguishing fluid fills up space between the motor vehicle and the sheet from the ground up to the motor vehicle, based on the formed tight abutment between the casing assembly, the ground, and the vehicle tires, resulting in the fire-extinguishing fluid reaching the at least one battery for extinguishing the fire emanating therefrom.

10. The cover according to claim 9, wherein the at least one opening comprises a plurality of openings.

11. The cover according to claim 9, wherein the fire-extinguishing fluid comprises water.

12. The cover according to claim 9, wherein the sheet is rectangular.

13. The cover according to claim 9, further comprising a securing mechanism attached to the pulled handles that maintains the tight abutment between the casing assembly, the ground, and the vehicle tires when the fire-extinguishing fluid is run through the at least one opening.

14. The cover according to claim 9, wherein a fluid-tight abutment is formed between the casing assembly, the ground, and the vehicle tires.

15. The cover according to claim 14, further comprising a securing mechanism attached to the pulled handles that maintains the fluid-tight abutment is formed between the casing assembly, the ground, and the vehicle tires when the fire-extinguishing fluid is run through the at least one opening.

* * * * *